United States Patent
Lagarde et al.

(10) Patent No.: US 9,599,996 B2
(45) Date of Patent: Mar. 21, 2017

(54) METHOD FOR CONTROLLING A SCREEN, AND ACTUATOR SUITABLE FOR SUCH A METHOD

(75) Inventors: Eric Lagarde, Sallanches (FR); Frederic Maraval, Passy (FR)

(73) Assignee: SOMFY SAS, Cluses (FR)

( * ) Notice: Subject to any disclaimer, the term of this patent is extended or adjusted under 35 U.S.C. 154(b) by 110 days.

(21) Appl. No.: 14/235,881

(22) PCT Filed: Aug. 3, 2012

(86) PCT No.: PCT/EP2012/065227
§ 371 (c)(1),
(2), (4) Date: Jan. 29, 2014

(87) PCT Pub. No.: WO2013/020907
PCT Pub. Date: Feb. 14, 2013

(65) Prior Publication Data
US 2014/0138033 A1    May 22, 2014

(30) Foreign Application Priority Data
Aug. 5, 2011    (FR) ...................................... 11 57194

(51) Int. Cl.
| | |
|---|---|
| *H02K 7/14* | (2006.01) |
| *G05D 3/00* | (2006.01) |
| *E06B 9/68* | (2006.01) |
| *E06B 9/32* | (2006.01) |
| *H02P 29/00* | (2016.01) |

(Continued)

(52) U.S. Cl.
CPC ............ *G05D 3/00* (2013.01); *E05F 15/603* (2015.01); *E05F 15/70* (2015.01); *E06B 9/32* (2013.01); *E06B 9/68* (2013.01); *H02P 29/00* (2013.01); *E05Y 2900/00* (2013.01); *E05Y 2900/106* (2013.01); *E06B 2009/6845* (2013.01)

(58) Field of Classification Search
CPC ............ H02H 3/26; B04B 13/003; H02P 6/16
USPC ............................................... 318/3, 6, 9, 14
See application file for complete search history.

(56) References Cited

U.S. PATENT DOCUMENTS 4,641,938 A * 2/1987 Lazzati ......................... 396/482
5,515,898 A * 5/1996 Alcocer ..................... 160/84.02
(Continued)

FOREIGN PATENT DOCUMENTS

| DE | 10 2005 039532 | 3/2007 |
|---|---|---|
| EP | 1 508 844 | 2/2005 |

(Continued)

OTHER PUBLICATIONS

International Search Report dated Sep. 28, 2012, corresponding to PCT/EP2012/065227.

*Primary Examiner* — Rina Duda
(74) *Attorney, Agent, or Firm* — Young & Thompson

(57) ABSTRACT

A method to be used for controlling a screen (1) including a load bar (2), a flexible element (4) supporting the load bar, and at least one controlled member for winding the flexible member, in order to move the load bar (2) between a first high or low position and a second low or high position, the movement resulting from an angular movement of the winding member. The method includes at least one step in which the angular movement of the of the winding member (52) is controlled with a temporal set value ($\theta(t)$) of the instantaneous angular position ($\gamma(t)$) of the winding member (52).

19 Claims, 4 Drawing Sheets

(51) Int. Cl.
*E05F 15/603* (2015.01)
*E05F 15/70* (2015.01)

(56) References Cited

U.S. PATENT DOCUMENTS

| | | | |
|---|---|---|---|
| 5,760,558 A * | 6/1998 | Popat | 318/480 |
| 6,263,260 B1 * | 7/2001 | Bodmer et al. | 700/275 |
| 6,283,190 B1 | 9/2001 | Hu et al. | |
| 7,599,612 B2 | 10/2009 | Moseley et al. | |
| 8,125,165 B2 | 2/2012 | Cieslik | |
| 8,193,742 B2 * | 6/2012 | Skinner et al. | 318/34 |
| 2005/0039863 A1 | 2/2005 | Bruno | |
| 2007/0039243 A1 | 2/2007 | Theile et al. | |
| 2007/0221338 A1 | 9/2007 | Meewis et al. | |
| 2008/0260363 A1 | 10/2008 | Carmen et al. | |
| 2009/0255188 A1 | 10/2009 | Theile et al. | |
| 2010/0006240 A1 | 1/2010 | Cieslik | |
| 2011/0061818 A1 | 3/2011 | Geriniere et al. | |
| 2011/0265958 A1 * | 11/2011 | Skinner et al. | 160/127 |
| 2012/0234504 A1 * | 9/2012 | Skinner et al. | 160/123 |

FOREIGN PATENT DOCUMENTS

| | | |
|---|---|---|
| EP | 2 120 119 | 11/2009 |
| FR | 2 557 397 | 6/1985 |
| GB | 2 118 739 | 11/1983 |
| WO | 2009/150345 | 12/2009 |

\* cited by examiner

METHOD FOR CONTROLLING A SCREEN, AND ACTUATOR SUITABLE FOR SUCH A METHOD

FIELD OF THE INVENTION

The invention relates to a method for controlling a screen that comprises a load bar, a flexible element supporting this load bar and a controlled member for winding this flexible element. Such a flexible element can be a panel of a blind or of a roller blind or a strap or a string for suspending the load bar of a venetian blind.

BACKGROUND OF THE INVENTION

In order to harmoniously move the screens of a group of screens, it is known in EP-A-2 120 119 to determine for each screen a shift parameter between two reference positions, of which one is shared by the various screens of the group. It is also known in WO-A-2009/150345 to move the end of a screen when it becomes the farthest away from a shared position to be reached for a group of screens. It is finally known in U.S. Pat. No. 7,599,612 to take the winding diameter and the thickness of a flexible element into account in order to configure a roller blind.

These various approaches aim to obtain, on the same façade, a harmony in the movement of the blinds during their opening and their closing, in particular when the latter have a similar course of travel between a shared high position and a low position and when they are controlled simultaneously.

However, irregularities can occur during the movement of a load bar which can be slowed down or temporarily wedged in a slider. In this case, with the known techniques, this load bar is moved with a delay in relation to the other load bars of a group of screens which are controlled in speed.

These irregularities or braking in the movement of a load bar can be accidental, due to an obstacle, or recurring, for example in the case of increased friction resulting from the ageing of an installation. These irregularities induce load variations on the actuator which drives the winding member of the flexible element and these load variations are not taken into account in controlling the movement of the load bar.

It is moreover known, for example in U.S. Pat. No. 6,283,190, to start a drive motor of a winding tube of a blind string at full power, then to carry out a control in terms of speed. Here again, in the event of a slowdown or blocking, the lag of a load bar cannot be caught up.

It is these disadvantages that the invention intends more particularly to overcome by proposing a new method for controlling a screen comprising a load bar and a flexible element supporting this load bar, with this method making it possible to optimise the movement of the load bar, including in the case of irregularity, for example in the event of friction of the load bar in sliders.

SUMMARY OF THE INVENTION

To this effect, the invention relates to a method for controlling a screen comprising a load bar, a flexible element supporting this load bar and a controlled member for winding the flexible element, in order to move the load bar between a first high or low position and a second low or high position, this movement resulting from an angular movement of the winding member. This method is characterised in that it comprises at least one step a) wherein the angular movement of the winding member is controlled with a temporal set value of the instantaneous angular position of the winding member.

Thanks to the invention, the movement of the load bar of the screen is carried out based on a set value of the position of the winding member. In the case of irregularity, for example due to an obstacle on the path of the load bar, the delay taken by the winding member is automatically compensated since it is controlled to follow its set value of the angular position. In the case where several screens are manoeuvred simultaneously and wherein one of them is slowed down or blocked temporarily, it can as such catch up with the other screens since the set value of the position of the various screens can be chosen in such a way that their movement is coordinated. Moreover, when the winding of the screen is slowed down, for example due to an obstacle, the acceleration of the system can be limited by the control loop in order to prevent a deterioration of the installation which would be linked to an increase in the instantaneous torque produced by the actuator.

According to advantageous but not mandatory aspects of the invention, such a method can incorporate one or several of the following characteristics, taken in any technically permissible combination:

The temporal set value of the angular position of the controlled winding member is expressed, as a function of time, according to a first law corresponding to a progressive starting, with an acceleration taking an angular speed of the winding member, from a zero value to a given value, a second law corresponding to a movement at a substantially constant angular speed over a portion of the course of the load bar and a third law corresponding to a progressive stopping, with a deceleration taking the angular speed to a zero value.

The second law corresponds to a rotation of the winding member with a speed that is substantially equal to that obtained at the end of the progressive starting.

The method comprises a step of implementing a control loop, of the PID type or other known corrector of the state of the art, which, following a temporary deviation observed, provides, through acceleration or slowing down of the rotation of the winding member, that the instantaneous angular position of the winding member coincides with a curve of the temporal set value of the angular position.

The invention further relates to a method for controlling a group of screens, for example screens mounted on the same façade of a building, with these screens each comprising a load bar, a flexible element supporting the load bar and a controlled member for winding the flexible element, in order to move the load bar of each screen between a first high or low position and a second low or high position. This method is characterised in that, for each screen, a method such as mentioned hereinabove is implemented and in that the temporal set value of the angular position used for each screen is determined for a coordinated movement of the load bars, between their respective first and second positions.

The invention further relates to an electric actuator which is designed for the implementing of a method such as mentioned such as mentioned hereinabove within a screen that comprises a flexible element supporting a load bar, as well as a member for winding this flexible element, with this member being driven in rotation by the actuator. This actuator is characterised in that it comprises means for determining a temporal set value of the angular position of the winding member and controlling the actuator to this set value.

More preferably, the actuator comprises a direct current motor and the means for controlling include an angular position sensor of a rotor of the motor or of the winding member itself.

The invention further relates to a set of screens provided with an actuator such as that mentioned hereinabove. Each actuator can have its own means of control which respond to commands provided by an offset command point that is common to the set of screens. This makes it possible to coordinate the movement of the load bars.

Finally, the invention relates to a home automation installation that comprises at least one screen provided with an actuator such as mentioned hereinabove or a set of screens such as mentioned hereinabove.

BRIEF DESCRIPTION OF THE DRAWINGS

The invention shall be better understood and other advantages of the latter shall appear more clearly in light of the following description of an embodiment of a method and of a screen in accordance with its principle, provided solely by way of example and made in reference to the annexed drawings wherein.

DETAILED DESCRIPTION OF THE INVENTION

Figure 1:
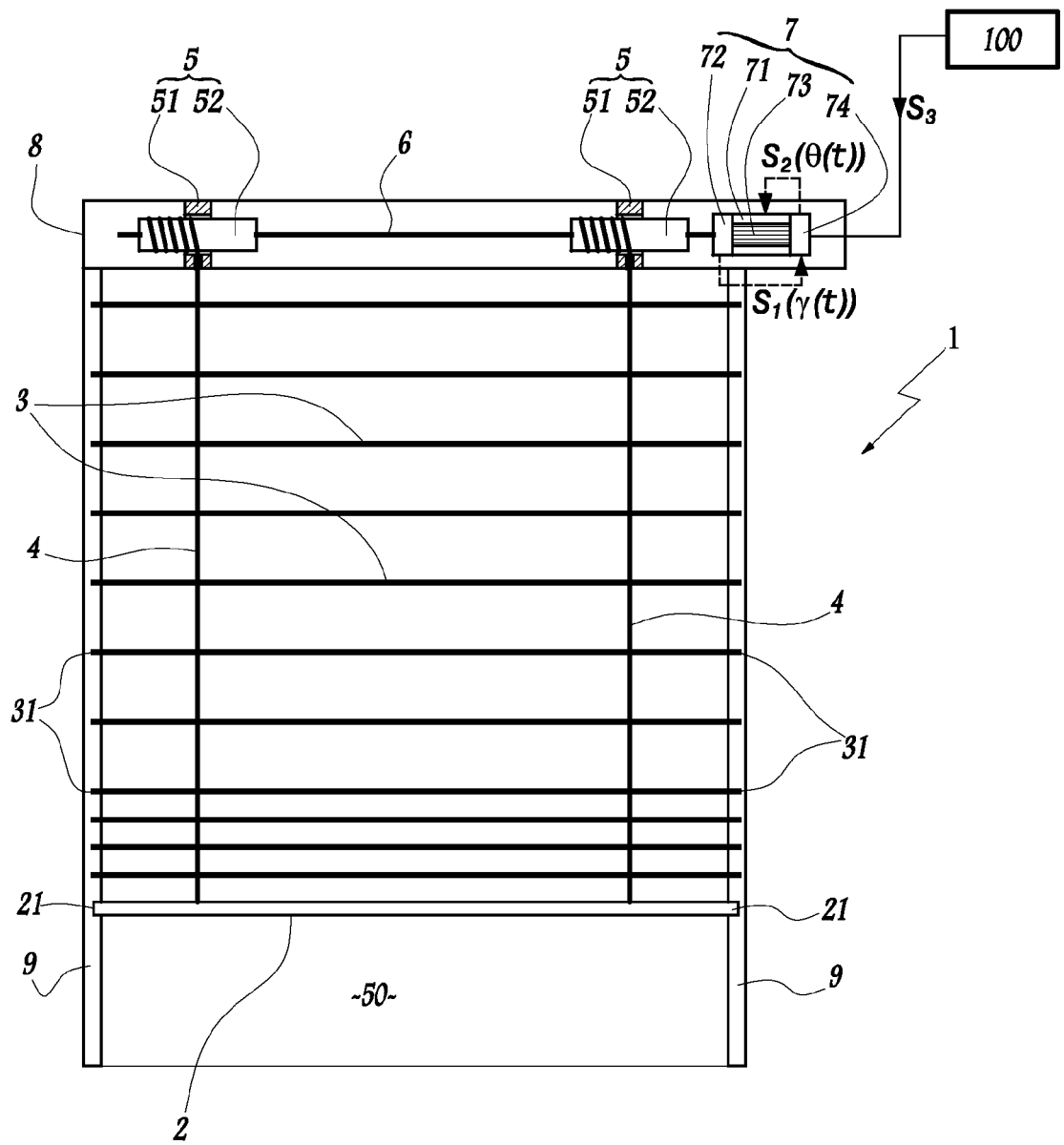
FIG. 1 is a block diagram of a screen in accordance with the invention and provided for the implementation of a method in accordance with the invention.

The screen 1 shown in FIG. 1 is of the venetian blind type and comprises a mobile portion that includes a load bar 2 and slats that can be oriented 3. This mobile portion is intended to selectively obscure an opening 50 such as a window. The load bar 2 is supported by two cords 4 which extend from two winding devices 5. The ends 21 of the load bar 2 and the ends 31 of the slats that can be oriented 3 are engaged in two sliders 9 arranged on either side of the opening 50.

Each winding device comprises a guide 51 and a drum 52 whereon each cord 4 can be selectively wound. The two drums are connected by a shaft 6 which is driven by an actuator 7 which comprises a direct current electric motor 71 as well as a sensor 72 of the angular position of the rotor 73 of the motor 71 or of the shaft 6. The sensor 72 makes it possible to determine the angular position of the rotor 73 or of the shaft 6 using a predetermined reference period.

Alternatively, straps can be used in place of the cords 4, with these straps then winding over themselves on drums 52.

Other types of screens can be used with the invention, in particular blinds with a flexible panel, of the windable fabric type, fixed by an end to the load bar and by the other end to a winding tube. The latter extends generally across the entire width of the opening 50 to be obscured.

The winding shaft of the screen 1 is comprised of the central shaft of the rotor 73, the shaft 6 or the output shaft of the actuator. In the case of a screen with winding tube, the winding shaft is comprised of this tube.

The sensor 72 can for example be of the inductive or optical type. It detects the actual position $\gamma(t)$ of the winding shaft as defined hereinabove at each instant t.

The elements 5 to 7 are arranged in a housing 8 which is mounted in the upper portion of the opening 50 to be obscured with the screen 1.

A control unit 74 is integrated into the actuator 7. The sensor 72 is electrically connected to this unit to which it provides information concerning the instantaneous actual angular position $\gamma(t)$ of the winding shaft, here the central shaft of the rotor 73, in the form of a first electric signal $S_1(\gamma(t))$.

The control unit 74 controls the motor 71 by supplying the latter based on a second electric signal $S_2(\theta(t))$ developed using an instantaneous set value $\theta(t)$, calculated by a controlling system included in the unit 74, for the value of the angular position of the winding shaft. The controlling system implements a control loop which is advantageously of the PID type.

The unit 74 is connected to a control box 100 by the intermediary of a wired connection 101 whereon flows electronic signals $S_3$ for controlling the screen 1. The box 100 is offset, i.e. at a distance, in relation to the screen 1. The unit 74 can also emit to the box 100 a return signal not shown which contains information concerning the state and/or the position of the screen 1.

Alternatively, the connection between the elements 74 and 100 is wireless.

Figure 2:
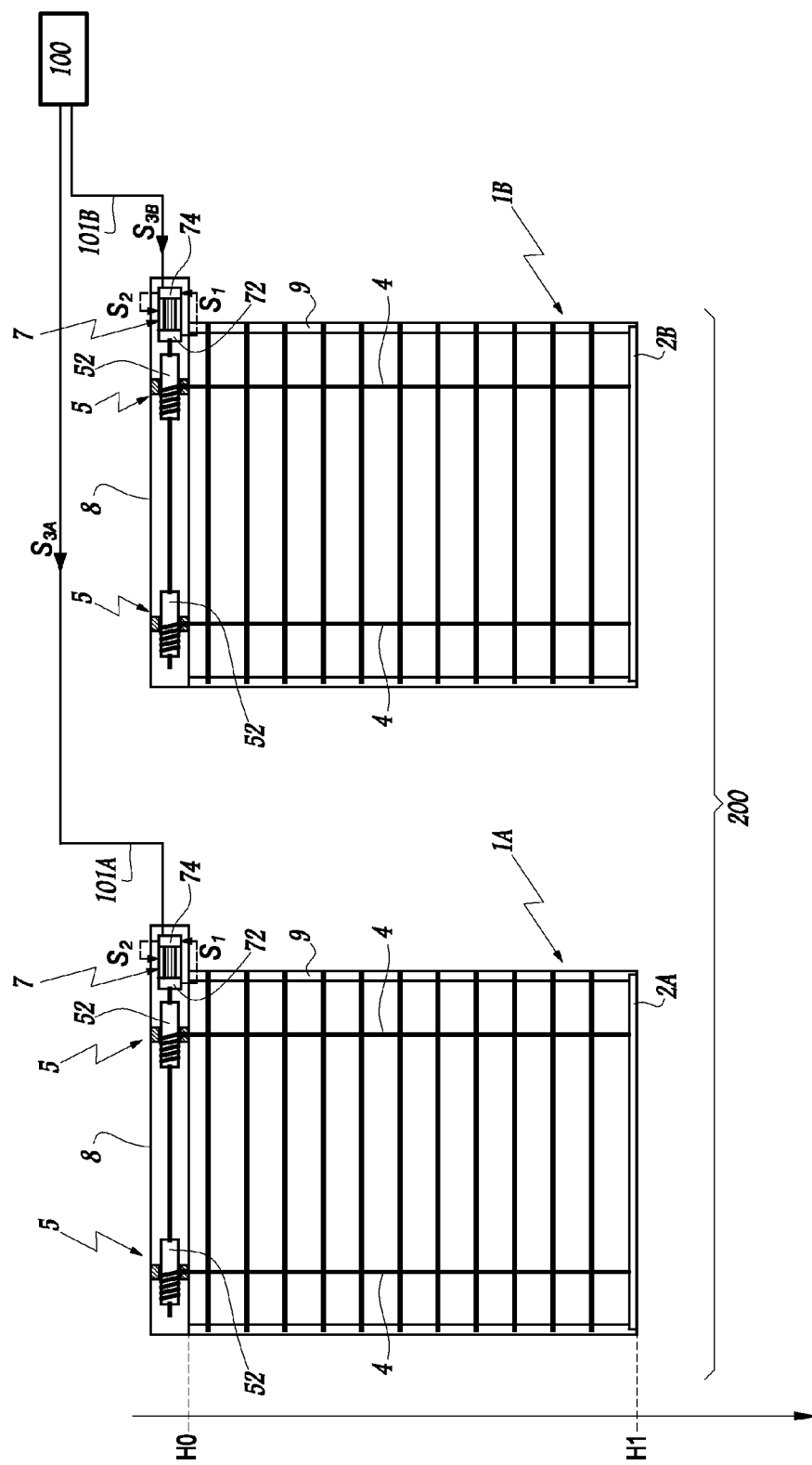
FIG. 2 is a block diagram of an installation in accordance with the invention comprising two screens such as that of FIG. 1 each controlled by a method in accordance with the invention, with these screens being in a first position.
Figure 3:
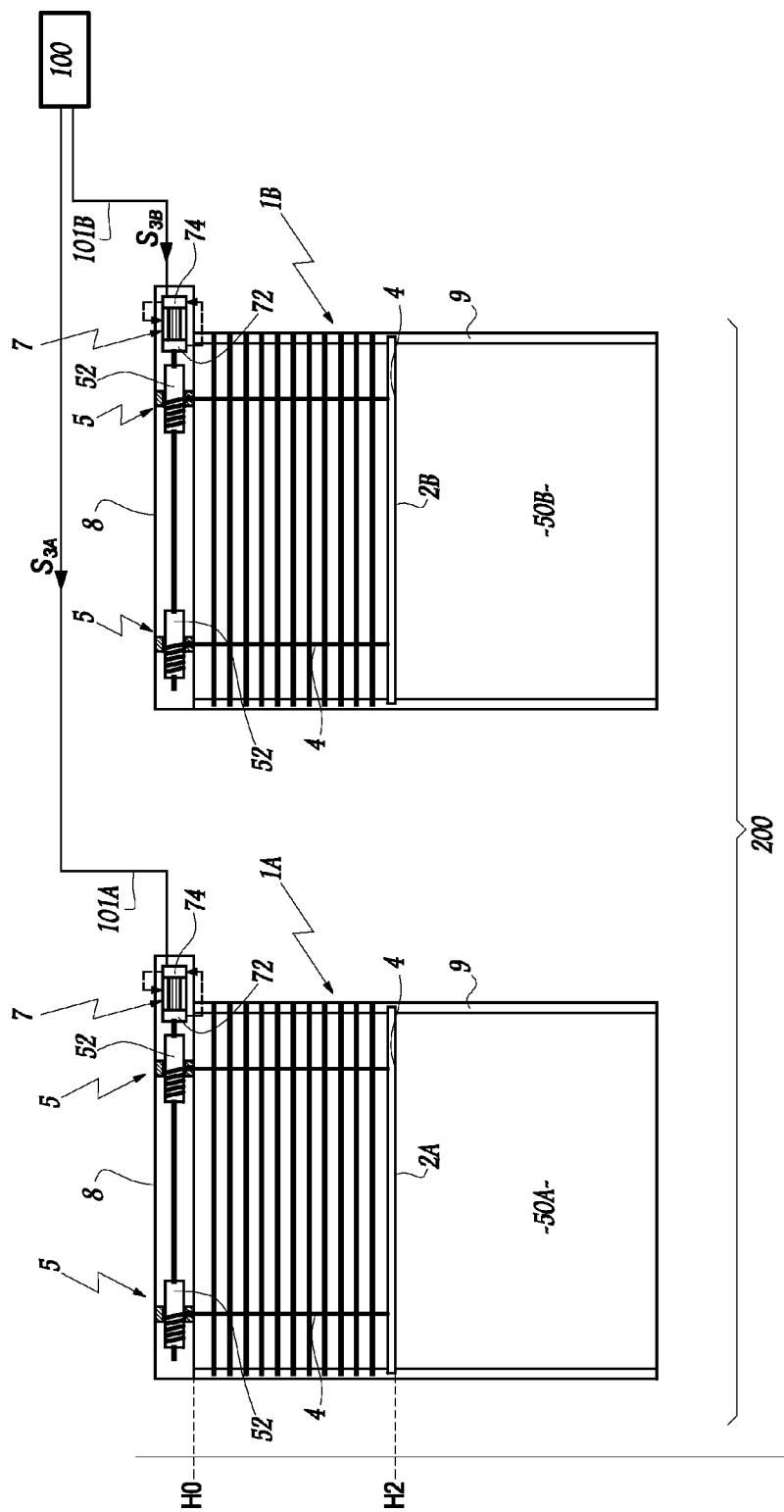
FIG. 3 is a view similar to FIG. 2, when the screens are in a second position.

The invention can be implemented in the framework of an installation 200 such as that shown in FIGS. 2 and 3 wherein several screens of the type of the screen 1 are used. In the figures, the installation 200 comprises two screens 1A and 1B. In practice, the number of screens is chosen according to the number of openings of a building to be obscured and it can be largely greater than two.

In FIGS. 2 and 3, the two screens 1A and 1B used are of the type of the screen 1 shown in FIG. 1. The references of the elements that comprise the screens 1A and 1B bear the same references as those of the screen 1 of FIG. 1, except for the load bars which are respectively referenced as 2A and 2B. Each actuator 7 has its own control unit 74. An offset control box 100, connected by wireless connections 101A and 101B to the units 74, is used to control the movement of the two screens simultaneously, thanks to electronic signals $S_{3A}$ and $S_{3B}$ sent respectively by the box 100 to the units 74 of the screens 1A and 1B.

According to an alternative of the invention, the control box 100 incorporates a control unit common to the two screens. According to another alternative, the connection between the box 100 and the units 74 is wireless.

It is considered that the two openings 50A and 50B obscured by the screens 1A and 1B are aligned, in that their respective upper limits are located at the same height, noted as H0 through convention, and that their respective lower limits are also situated at the same height.

The method can also be applied to different openings, having at least one common portion whereon the movement of the screens has to be harmonised.

In FIG. 2, the two screens are in low configuration, in that their respective load bars 2A and 2B are each at a minimum height H1 in relation to the height H0, i.e. at a maximum distance in relation to the reference H0.

Consider the case whereon it is desired to bring the two screens 1A and 1B into the configuration of FIG. 3 where their load bars are at the same height H2 greater than the height H1. In other words, it is desired to raise the load bars 2A and 2B from the height H1 to the height H2.

One of the objectives of the invention is that the movement of the two screens 1A and 1B is harmonious, i.e. that this movement is perceived as being synchronised or "unitary" by an observer looking at a façade wherein are arranged the two openings 50A and 50B.

To do this, each actuator 7 receives a position command $S_{3A}$ or $S_{3B}$ from the group control box 100, for example "positioning of the load bar at 10% of the total course of travel", or "complete opening". Each actuator 7 is then controlled by its control unit 74 thanks to a temporal set value of the angular position of its winding shaft.

More precisely, each actuator 7 is controlled with a law of predetermined movement of the type θ(t) where θ is the instantaneous angular position of the winding shaft and t is an instant.

The value θ(t) is used at each instant t by the unit 74 as a set value in order to control each actuator 7. It is included in the signal $S_2$ sent to the motor 71 by the unit 74 within the actuator 7. In other words, a unit 74 controls the operation of the actuator 7 at which it belongs to the value θ(t), for each instant t of the movement of the load bars 2A and 2B, between the positions corresponding to the heights H1 and H2.

As such, when a movement has to be controlled starting with an instant $t_0$, for example for the screen 1A, the instantaneous movement set value θ(t) for each instant, starting from $t_0$, is calculated by a computer of the unit 74 of this screen. This set value θ(t) is then used to control the actuator 7 of this screen, in such a way that the actual position γ(t) of the first winding shaft belonging to the actuator 1A is equal to or is the most equal possible to the value θ(t), for each instant, with this value γ(t) being detected by the sensor 72 and used as a counter-reaction value in a control loop implemented in the unit 74 of the screen 1A.

If, during the raising of the load bar 2A of the screen 2, the latter encounters an obstacle in the slide 9, for example the head of a screw which has become progressively loose, the load bar 2A is momentarily slowed down, when passing this obstacle. This is detected because the value of the actual angular position γ(t) of the rotor then move away from the set value θ(t) for at least one instant t following the encounter of the load bar 2A with the obstacle. In the sense that the actuator 7 of the screen 1A is controlled with the temporal set value θ(t) of the instantaneous angular position for the first winding shaft, the delay taken by the bar 2A in its movement between the positions H1 and H2, in relation to the bar 2B of the screen 1B, will later be compensated by the control loop. Indeed, this delay is detected by the sensor 72 which informs the unit 74 of it thanks to the signal $S_1(γ(t))$, which acts on the motor 71 in order to temporarily accelerate its rotation and again align the actual angular position γ(t) of the winding shaft on the temporal set value θ(t) of the angular position for the rest of the course of travel.

Preferably, the acceleration is not immediate and the instantaneous angular position γ(t) of the winding shaft can remain temporarily deviated in relation to the temporal set value θ(t) of the angular position. Indeed, due to the controlling, and in particular to its dynamic performance, an acceleration of the winding is then generated without any sudden movements in order for the instantaneous angular position γ(t) to coincide with the temporal set value θ(t) of the angular position.

Figure 4:
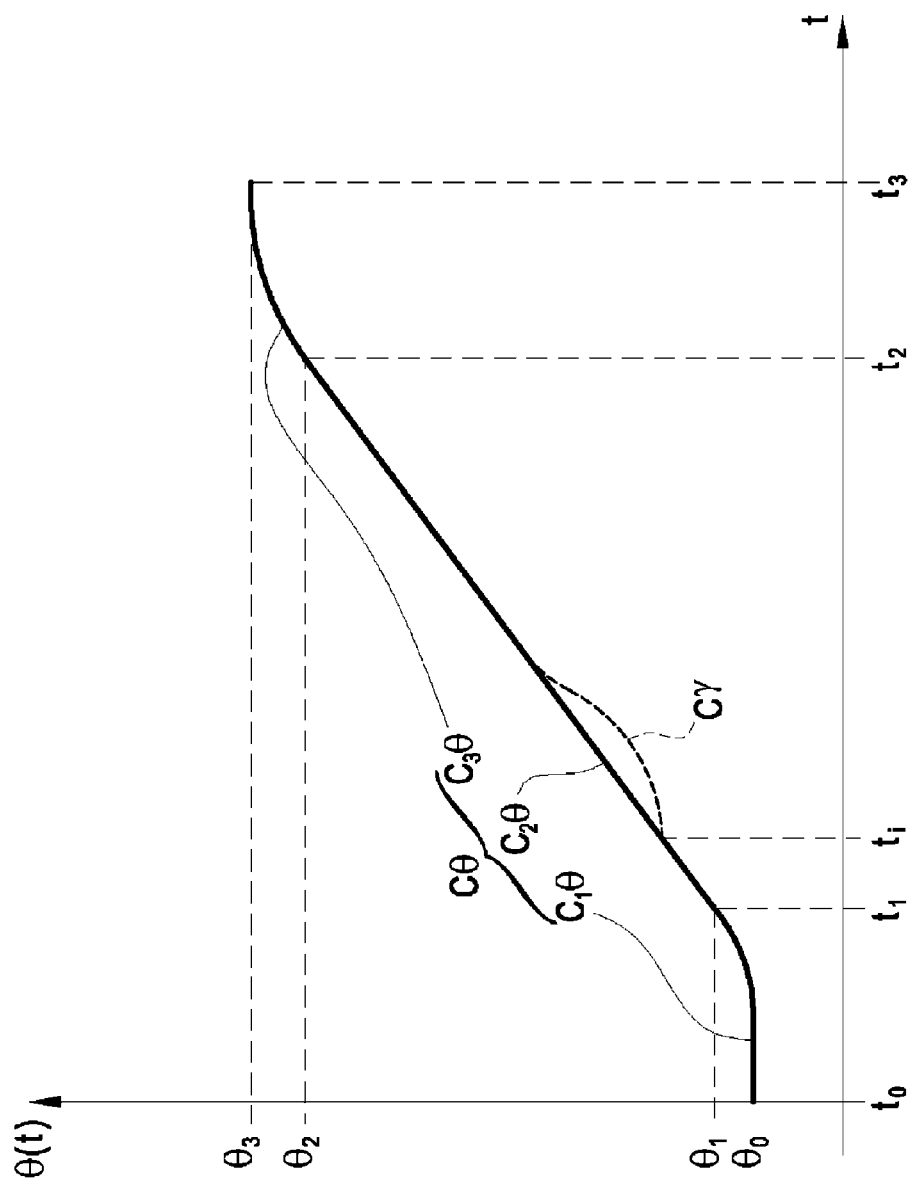
FIG. 4 is a representation of a curve of a set value of the angular position as a function of time, for a winding shaft of a screen such as those shown in FIGS. 1 to 3.

As shown in FIG. 4, the temporal function used for the temporal set value θ(t) of the instantaneous angular position of the winding shaft can be expressed according to time in a manner that is differentiated according to the instant t at which one is located during a course of movement. This makes it possible to obtain a starting and a stopping of the system "gently" without any sudden movements seen by the user.

As such, the curve Cθ, which shows the temporal set value of the instantaneous angular position for the winding shaft, comprises a first portion $C_1θ$ which corresponds to a first law of a set value for the progressive starting from an instant $t_0$ and an original angular position $θ_0$, with this angular position corresponding to the position of the load bar 2A in FIG. 2. According to this first set value law which corresponds to the curve $C_1θ$ over the period $t_0$-$t_1$, the set value angular position passes from a position $θ_0$ to a position $θ_1$ with an acceleration corresponding to the slope of the curve $C_1θ$ at point $θ_1(t_1)$. Starting from this instant $t_1$ at which is reached the position $θ_1$, the set value of the angular speed of rotation is maintained constant. In other words, the function of the set value, which correspond to a second set value law implemented between the instants $t_1$ and $t_2$, can be expresses as a function of the time t in the form:

$$C_2θ(t)=K(t-t_1)+θ_1$$

where K is a constant coefficient equal to the instantaneous angular speed at the instant $t_1$, or $K=dθ_1/dt$. This second law is represented by the curve $C_2θ$ in FIG. 4.

Between the instants $t_1$ and $t_2$, the set value of the angular speed of the winding shaft is therefore constant and equal to K.

Alternatively, between the instants $t_1$ and $t_2$, the set value of the angular speed can vary slightly, be less than 5%. Whether it is invariable or slightly variable, this set value of the angular speed is substantially constant.

At the end of the movement, the winding shaft is slowed down progressively, which is shown on the third curve $C_3θ$ which ends with a horizontal tangent and which corresponds to a third set value law implemented starting from the instant $t_2$.

In practice, the curve Cθ is chosen so that its position $C_2θ$ which corresponds to a movement at a constant angular speed of the winding shaft represents more than 50% of the course of travel of the load bars.

The curve in dotted lines Cγ in FIG. 4 shows the value of the instantaneous angular position of the winding shaft in the case of a slowdown of the load bar 2A, at the passage of an obstacle in a slider 9 at an instant $t_i$, during the movement between the positions of FIGS. 2 and 3, with this slowing down being followed by an acceleration when the load bar has passed the obstacle. The curve Cγ then converges towards the curve Cθ, according to the principle of controlling, with the curve Cθ being the curb for the temporal set value.

As such, even in the case of a momentary delay of the screen 1A in relation to the screen 1B, this delay is offset, in such a way that the movement of the two screens 2A and 2B is harmonious.

The invention is therefore interesting for controlling a set of several screens, since it makes it possible to coordinate the movement of their respective load bars, due to the controlling of the various actuators 7 at the same set value coming from the control box 100. Each actuator has its unit 74 including, with the associated sensor 72, the means for controlling the movement of each load bar between its first and second positions, according to the temporal set value of the instantaneous angular position of the winding member of each screen. The joint controlling of the set of screens of the group is carried out by an offset member, i.e. the box 100, which in particular has for function to provide a temporal synchronisation.

In terms of equipment, the invention is relatively simple to implement since it is sufficient to use in each actuator 7 a sensor 72 in conjunction with a control unit 74 programmed in a suitable manner to control the movement of the load bars 2 between their respective starting and ending positions, in relation to the temporal set value of the instantaneous angular position θ(t) of the winding shaft.

Alternatively, the motor 71 can by of the asynchronous type.

According to another alternative, the sensor 72 can be dissociated from the electric motor 71 and mounted at the opposite end of the shaft 6, as long as it makes it possible to know the instantaneous angular position of the winding shaft.

When several screens 1A, 1B etc. are associated, each is controlled by its own means of controlling. Alternatively, it could be considered that their means of controlling be logically connected together in order to control them in a coordinated manner. In any case, the same temporal set value of the instantaneous angular position can be used to control the different screens of a set. As such, when their respective starting and ending positions are aligned, a coordinated movement of the various screens is obtained.

The invention is described hereinabove in the case where their own controlling means, formed by the elements 72 and 74, are provided in each screen 1, 1A, 1B, etc. They make it possible to process the commands received from the box 100 which is common to the installation. Alternatively, the means for controlling are common to the various screens and the controlling function is common. This approach requires a substantial flow of information between these controlling means and the actuators.

The invention has been described in the case of a raising of the load bar of a screen. It also applies in the case where this load bar is lowered, for example in the case of a wedging of the winding shaft.

The examples hereinabove concern the case wherein the screens used are screens for closing or solar protection. The invention can also be used for a projection screen, in particular for video projection. This is particularly advantageous in the case of manoeuvring many screens, for the modification of the projection format.

The invention claimed is:

1. A method for controlling a screen comprising a load bar, a flexible element supporting the load bar and at least one controlled winding member for winding the flexible element, in order to move the load bar between i) a first high or low position and ii) a second low or high position, the movement of the load bar resulting from an angular movement of the winding member driven by an electric actuator controlled by a control unit, said method comprising steps wherein:
   a) the angular position of the winding member is controlled, for each instant in time, with a law of predetermined movement θ(t), where θ is a temporal set value of the instantaneous angular position of the winding member, the temporal set value being included in a control signal of the electric actuator by the control unit, and t is an instant in time, and
   b) a control loop is implemented which, following a temporary deviation observed, provides, through acceleration or slowing down of the rotation of the winding member, that the instantaneous angular position of the winding member coincides with a predetermined curve of the temporal set value of the angular position, so that, when the load bar encounters an obstacle, the fact that an actual angular position γ(t) of the winding member moves away from the set value given by the law of predetermined movement θ(t) is compensated and the actual angular position γ(t) is aligned again on the set value.

2. The method according to claim 1, wherein the temporal set value of the angular position of the winding member is expressed as a function of time according to
   a first law corresponding a progressive starting, with an acceleration taking an angular speed of the winding member from a zero value to a given value,
   a second law corresponding to a movement at a substantially constant angular speed over a portion of the course of the load bar, and
   a third law corresponding to a progressive stopping, with a deceleration taking the angular speed to a zero value.

3. The method according to claim 2, wherein the second law corresponds to a rotation of the winding member with a speed that is substantially equal to that obtained at the end of the progressive starting.

4. The method according to claim 1, wherein the control loop is of the PID type.

5. The method of claim 1 implemented for controlling a group of said screen, in order to move the load bar of each screen between a first high or low position and a second high or low position, wherein for each screen, wherein the temporal set value of the angular position used for each screen is determined for a coordinated movement of the load bars between their respective first and second positions.

6. An electric actuator of a screen comprising a flexible element supporting a load bar and at least one controlled member for winding the flexible element, driven in rotation by the electric actuator, the electric actuator comprising controlling means for determining a law of predetermined movement θ(t), where θ is a temporal set value of an instantaneous angular position of the winding member and t is an instant in time and for controlling the actuator at the determined temporal set value θ, wherein the electric actuator is configured for controlling an angular position of the winding member to wind the flexible element and thereby move the load bar, wherein the controlling of the angular position of the winding member by the electric actuator uses, for each instant of time, the determined temporal set value θ of the determined instantaneous angular position of the winding member and wherein the controlling of the angular position of the winding member by the electric actuator implements a control loop that, following a temporary deviation observed, provides, through acceleration or slowing down of the rotation of the winding member, that the instantaneous angular position of the winding member coincides with a predetermined curve of the temporal set value of the angular position, so that, in case the load bar encounters an obstacle, the fact that an actual angular position γ(t) of the winding member moves away from the set value given by the law of predetermined movement θ(t) is compensated and the actual angular position γ(t) is aligned again on the set value.

7. The electric actuator according to claim 6, further comprising a direct current motor, wherein the controlling means include a sensor of the angular position of a rotor of the motor or of the winding member.

8. A home automation installation comprising:
   a screen comprising a load bar, and a flexible element supporting the load bar;

at least one controlled winding member that that is driven by an electric actuator controlled by an electronic unit and, via angular movement of the at least one controlled winding member, winds the flexible element in order to move the load bar i) between a first high position to a second low position and ii) between the second low position to the first high position and a second low or high position, wherein the angular movement of the at least one controlled winding member is controlled with a temporal set value of a determined instantaneous angular position of the at least one controlled winding member; and an electric actuator, the at least one controlled winding member being driven in rotation by the electric actuator to wind the flexible element and thereby move the load bar, wherein each said electric actuator comprises control means i) for determining, for each instant of time, a law of predetermined movement θ(t), where θ is a temporal set value of an instantaneous angular position of the winding member, the temporal set value being included in a control signal of the electric actuator by the control unit, and t is an instant in time and ii) for controlling the electric actuator at the temporal set value via a control loop that, following a temporary deviation observed, provides, through acceleration or slowing down of the rotation of the winding member, that the instantaneous angular position of the winding member coincides with a predetermined curve of the temporal set value of the angular position, so that, when the load bar encounters an obstacle, the fact that an actual angular position γ(t) of the winding member moves away from the set value given by the law of predetermined movement θ(t) is compensated and the actual angular position γ(t) is aligned again on the set value.

9. A home automation installation comprising a set of screens according to claim 8, wherein the control means of each electric actuator is comprised of a control unit that is integrated into the electric actuator that provides an offset command point.

10. The home automation installation of claim 8, further comprising a control box operatively connected to the control means, wherein,
the control box issues commands to the control means,
the electric actuator further comprises a direct current motor with a rotor, and
the control means of the electric actuator is comprised of i) a control unit that is integrated into the electric actuator, and ii) a sensor of the angular position of the rotor of the direct current motor.

11. The home automation installation of claim 8, further comprising a control box operatively connected to the control means, wherein,
the control box issues commands to the control means,
the electric actuator further comprises a direct current motor with a rotor and a winding member, and
the control means of the electric actuator is comprised of i) a control unit that is integrated into the electric actuator, and ii) a sensor of the angular position of the winding member.

12. The home automation installation of claim 9, wherein, each said electric actuator further comprises a direct current motor with a rotor, and
each said control means further includes a sensor of the angular position of the rotor of the direct current motor.

13. The home automation installation of claim 9, wherein, each said electric actuator further comprises a direct current motor with a rotor and a winding member, and
each said control means further includes a sensor of the angular position of the winding member.

14. A method for controlling a screen comprising a load bar, a flexible element supporting the load bar, and a winding member driven by an electric actuator controlled by a control unit for winding the flexible element, in order to move the load bar between i) a first high or low position and ii) a second low or high position, the method comprising:
determining an instantaneous angular position of the winding member; and
controlling, for each instant in time, an angular position of the winding member to wind the flexible element and thereby move the load bar, wherein the controlling of the angular movement of the winding member uses a law of predetermined movement θ(t), where θ is a temporal set value of the determined instantaneous angular position of the winding member, the temporal set value being included in a control signal of the electric actuator by the control unit, and t is an instant in time, so that the actual angular position γ(t) of the winding member is i) equal to, or ii) is the most equal possible to, the temporal set value θ, for each instant in time, and
implementing a control loop that, following a temporary deviation observed, provides, through acceleration or slowing down of the rotation of the winding member, that the instantaneous angular position of the winding member coincides with a predetermined curve of the temporal set value of the angular position, so that, when the load bar encounters an obstacle, the fact that an actual angular position γ(t) of the winding member moves away from the set value given by the law of predetermined movement θ(t) is compensated and the actual angular position γ(t) is aligned again on the set value.

15. The method of claim 14, wherein the angular movement of the winding member is controlled with the temporal set value of the instantaneous angular position of the winding member in such a way that the angular position γ(t) of the winding member is equal to the temporal set value θ, for each instant in time.

16. The method of claim 14, wherein the angular movement of the winding member is controlled with the temporal set value of the instantaneous angular position of the winding member in such a way that the angular position γ(t) of the winding member is the most equal possible to the temporal set value θ, for each instant in time.

17. The method according to claim 14, wherein the temporal set value of the angular position of the winding member is expressed as a function of time according to:
a first law corresponding a progressive starting, with an acceleration taking an angular speed of the winding member from a zero value to a given value,
a second law corresponding to a movement at a substantially constant angular speed over a portion of the course of the load bar, and
a third law corresponding to a progressive stopping, with a deceleration taking the angular speed to a zero value.

18. The method according to claim 17, wherein the second law corresponds to a rotation of the winding member with a speed that is substantially equal to that obtained at the end of the progressive starting.

19. The method according to claim 14, further comprising a step of implementing a control loop that, following a temporary deviation observed, provides, through acceleration or slowing down of the rotation of the winding member, that the instantaneous angular position of the winding member coincides with a curve of the temporal set value of the angular position.

* * * * *